(No Model.)
C. W. HELLENBRAND.
RECEPTACLE AND HEATER FOR TEA, COFFEE, MILK, &c.
No. 383,572. Patented May 29, 1888.
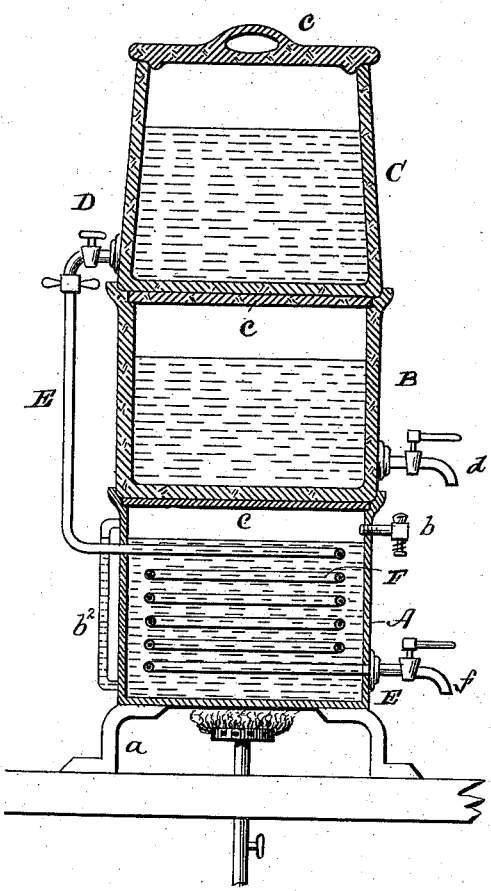
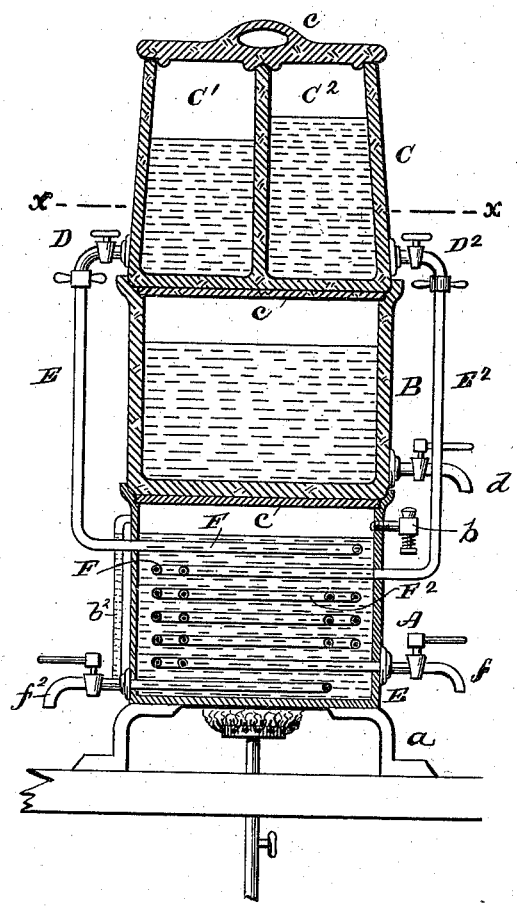
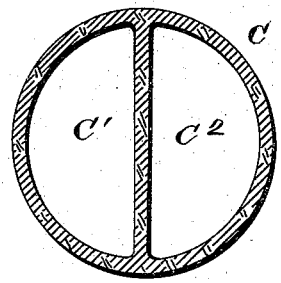
WITNESSES:
INVENTOR:
C. W. Hellenbrand
BY Munn & Co
ATTORNEYS.

UNITED STATES PATENT OFFICE.

CHARLES W. HELLENBRAND, OF SALEM, OREGON.

RECEPTACLE AND HEATER FOR TEA, COFFEE, MILK, &c.

SPECIFICATION forming part of Letters Patent No. 383,572, dated May 29, 1888.

Application filed October 3, 1887. Serial No. 251,326. (No model.)

*To all whom it may concern:*

Be it known that I, CHARLES W. HELLENBRAND, of Salem, in the county of Marion and State of Oregon, have invented a new and Improved Receptacle and Heater for Tea, Coffee, Milk, &c., of which the following is a full, clear, and exact description.

The purpose of the present invention is to provide a useful and convenient receptacle into which tea, coffee, milk, &c., may be placed, whereby the same are kept fresh and in good condition, and when desired to be withdrawn for use are at the desired degree of heat, all substantially as will be seen from the description of the parts hereinafter given.

Reference is to be had to the accompanying sheet of drawings, in which similar letters of reference indicate corresponding parts in all the figures.

Figure 1 is a central vertical section of the apparatus of the present invention. Fig. 2 is a central sectional view of an apparatus similar to Fig. 1, but possessing increased capabilities; and Fig. 3 is a horizontal sectional view on line $x\ x$, Fig. 2.

In the drawings are shown three jars or tanks, A B C, the lower, A, for containing water, made of copper or other suitable metal or material, and provided with supports or legs $a$, whereby a lamp or gas-jet may be placed beneath for heating it, and having a safety-valve, $b$, for the escape of the steam. The intermediate jar, B, resting on the tank A, is intended to receive milk, being provided with a cock, $d$, for its withdrawal, and the jar C is for the reception of coffee, &c., and the tanks A B C may each be provided with a separate cover, $c$, for closing its mouth, or only the upper one so provided, the tanks A B each being covered by the tanks B C, respectively resting thereon. The jar C is provided with a cock, D, to which is connected a pipe, E, of block-tin or other non-corrosive metal or material, leading downwardly and entering the lower water-tank, A, where it is coiled around a number of times, as at F, and projected therefrom, as at E, where it is provided with a cock, $f$.

In operation the coffee, &c., is first boiled and strained and allowed to cool, and the clear liquid placed in the chamber C, the milk being placed in the intermediate chamber, B. On desiring to draw coffee, &c., for use the cock D is opened, allowing the liquid in the jar C to pass down into the coil F in the hot-water tank, whereby it is heated, and the cock $f$ being opened it is drawn therefrom into the cup. The milk is withdrawn from the intermediate jar, B, through cock $d$.

If desired, one apparatus may be adapted to hold two or more kinds of liquid—as tea and coffee—and such is shown in Figs. 2 and 3, where the jar C may contain two chambers, $C'\ C^2$—as, for instance, the one, $C'$, for holding coffee, and the other, $C^2$, for containing tea—each provided with their respective cocks $D\ D^2$, pipes $E\ E^2$, coils $F\ F^2$, and discharge-cocks $f\ f^2$, as is obvious, and again a greater number of receptacle jars or chambers may be provided with their respective cocks, pipes, and coils to contain, conduct, and heat other and additional liquids.

The jar C is preferably formed of a non-conducting material—such, for instance, as stone, earthenware, &c.—as may be also the jar B, as it is intended to keep the coffee, &c., comparatively cool, thereby retaining its flavor and fragrance longer, and to heat it only as it is used on being drawn through the coils.

Having thus fully described my invention, I claim as new and desire to secure by Letters Patent—

1. A heater for tea and coffee, comprising the hot water vessel A, having a removable cover, $c$, the separate and independent vessel C, above the hot-water vessel, and having a cock, D, on its outside, and a pipe leading into and through the vessel A from said outside cock, substantially as set forth.

2. A heater for tea, coffee, and milk, comprising the hot-water vessel A, the removable milk-vessel B upon the vessel A, and having a cock, $d$, and the vessel C upon the vessel B, and having a cock, D, on its outside, and the pipe E, leading from the said cock D into and through the hot-water vessel, and provided with a cock, $f$, substantially as set forth.

CHARLES W. HELLENBRAND.

Witnesses:
TILMON FORD,
LOUIS H. TARPLEY.